United States Patent
Foti et al.

(10) Patent No.: US 9,497,567 B2
(45) Date of Patent: Nov. 15, 2016

(54) SELECTION OF M2M DEVICES BY EXTERNAL TRIGGERING

(71) Applicant: Telefonaktiebolaget L M Ericsson (publ), Stockholm (SE)

(72) Inventors: George Foti, Dollard des Ormeaux (CA); Juan Antonio Sanchez Herrero, Madrid (ES); Maria Esther Bas Sanchez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 546 days.

(21) Appl. No.: 13/788,562

(22) Filed: Mar. 7, 2013

(65) Prior Publication Data

US 2014/0086143 A1    Mar. 27, 2014

Related U.S. Application Data

(60) Provisional application No. 61/663,091, filed on Jun. 22, 2012.

(51) Int. Cl.
*H04W 4/00* (2009.01)
*H04W 8/04* (2009.01)

(52) U.S. Cl.
CPC .............. *H04W 4/005* (2013.01); *H04W 8/04* (2013.01)

(58) Field of Classification Search
CPC .................................................. H04W 4/005
See application file for complete search history.

(56) References Cited

U.S. PATENT DOCUMENTS 5,678,179 A    10/1997 Turcotte et al.
8,780,796 B1    7/2014 Ballal et al.
(Continued)

FOREIGN PATENT DOCUMENTS

WO    2009103623 A2    8/2009
WO    2011062841 A1    5/2011
(Continued)

OTHER PUBLICATIONS

Third Generation Partnership Project, "3GPP TS 23.682 V11.0.0 (Mar. 2012)", 3rd Generation Partnership Project; Technical Specification Group Services and System Aspects; Architecture enhancements to facilitate communications with packet data networks and applications (Release 11). Mar. 2012. pp. 1-24.
(Continued)

*Primary Examiner* — Shaq Taha
(74) *Attorney, Agent, or Firm* — Murphy, Bilak & Homiller, PLLC

(57) ABSTRACT

Techniques for facilitating the activation or establishing of a data session between an M2M device and a service provider external to the wireless communications network serving the M2M device are disclosed. In an example method, a trigger message is received from the service provider, the trigger message including an external identifier for the wireless device. An internal network identifier for the wireless device and an associated data network identifier are identified, based on the external identifier. The internal network identifier and the data network identifier are then forwarded towards the wireless device, for use by the wireless device in activating or selecting a data session. The data network identifier may include an APN, or an NSAPI, or both, in some embodiments. The disclosed techniques are particularly useful in the context of wireless devices having subscriptions to more than one M2M service provider.

23 Claims, 6 Drawing Sheets

(56) References Cited

U.S. PATENT DOCUMENTS

| | | |
|---|---|---|
| 8,854,960 B2 | 10/2014 | Jain et al. |
| 8,953,508 B2* | 2/2015 | Zheng .................. H04W 8/26 370/310 |
| 2009/0023443 A1 | 1/2009 | Kieselmann et al. |
| 2009/0129263 A1 | 5/2009 | Osborn et al. |
| 2010/0008259 A1 | 1/2010 | Yoon et al. |
| 2011/0125925 A1 | 5/2011 | Bouthemy et al. |
| 2011/0128911 A1 | 6/2011 | Shaheen |
| 2011/0164107 A1 | 7/2011 | Tian et al. |
| 2011/0207491 A1 | 8/2011 | Swaminathan et al. |
| 2012/0042073 A1 | 2/2012 | Lassborn et al. |
| 2012/0257571 A1 | 10/2012 | Liao et al. |
| 2012/0265983 A1 | 10/2012 | Yegin et al. |
| 2012/0302229 A1* | 11/2012 | Ronneke .......... H04L 29/12754 455/422.1 |
| 2013/0016657 A1 | 1/2013 | Muhanna et al. |
| 2013/0017827 A1* | 1/2013 | Muhanna et al. ......... 455/426.1 |
| 2013/0142118 A1 | 6/2013 | Cherian et al. |
| 2013/0188515 A1 | 7/2013 | Pinheiro et al. |
| 2013/0196630 A1 | 8/2013 | Ungvari et al. |
| 2013/0203412 A1 | 8/2013 | Starsinic et al. |
| 2013/0212236 A1 | 8/2013 | Foti et al. |
| 2013/0273855 A1* | 10/2013 | Cherian et al. ................. 455/68 |
| 2013/0279373 A1 | 10/2013 | Ding et al. |
| 2013/0297744 A1 | 11/2013 | Foti |
| 2013/0310027 A1 | 11/2013 | Foti et al. |
| 2013/0315155 A1 | 11/2013 | Foti et al. |
| 2013/0318218 A1 | 11/2013 | Foti et al. |
| 2013/0332627 A1 | 12/2013 | Skog et al. |
| 2013/0339438 A1 | 12/2013 | Cherian et al. |
| 2014/0086143 A1 | 3/2014 | Foti et al. |
| 2014/0086144 A1 | 3/2014 | Foti et al. |
| 2014/0089442 A1 | 3/2014 | Kim et al. |
| 2014/0128113 A1 | 5/2014 | Zisimopoulos et al. |
| 2014/0185522 A1 | 7/2014 | Xu et al. |
| 2014/0219182 A1* | 8/2014 | Chandramouli et al. ..... 370/328 |
| 2014/0286237 A1* | 9/2014 | Bhalla .......................... 370/328 |
| 2015/0045074 A1 | 2/2015 | Wong et al. |

FOREIGN PATENT DOCUMENTS

| | | |
|---|---|---|
| WO | 2011098150 A1 | 8/2011 |
| WO | 2012142618 A2 | 10/2012 |
| WO | 2013115946 A1 | 8/2013 |

OTHER PUBLICATIONS

Third Generation Partnership Project, "3GPP TS 23.682 V11.3.0 (Dec. 2012)", 3rd Generation Partnership Project; Technical Specification Group Services and System Aspects; Architecture enhancements to facilitate communications with packet data networks and applications (Release 11). Dec. 2012. pp. 1-29.

Author Unknown, "ETSI TS 102 690 V2.0.1 (Dec. 2011)", ETSI. Technical Specification. Machine-to-Machine Communications (M2M); Functional Architecture. Dec. 2011. pp. 1-238.

Author Unknown, "Liaison Statement Answer to 3GPP SA2 on MTC Identification Aspects", ETSI TC M2M. 3GPP TSG-SA WG1 Meeting #55; S1-112213; M2M(11)0519r3. Aug. 8-12, 2011. pp. 1-2. Dublin, Ireland.

3rd Generation Partnership Project, "3GPP TS 23.682 V11.1.0 (Jun. 2012)," 3rd Generation Partnership Project; Technical Specification Group Services and System Aspects; Architecture enhancements to facilitate communications with packet data networks and applications (Release 11). Jun. 2012. pp. 1-27.

3rd Generation Partnership Project, "3GPP TR 23.888 V1.6.1 (Feb. 2012)," 3rd Generation Partnership Project; Technical Specification Group Services and System Aspects; System Improvements for Machine-Type Communications (Release 11). Feb. 2012. pp. 1-165.

Author Unknown, "Mapping Aspects for ETSI M2M Architecture," 3GPP TSG SA WG2 Meeting #85; TD S2-112291; May 16-20, 2011. pp. 1-11. Xi'an, China.

Author Unknown, "M2M Service Enablement," Telefon AB LM Ericsson; M2M(12)19-076. Mar. 8, 2012. pp. 1-10.

European Telecommunications Standards Institute. "Machine-to-Machine communications(M2M); Functional architecture." ETSI Technical Committee Machine-to Machine Communications (M2M),Technical Specification, ETSI TS 102 690 V1.1.9, Sep. 2012, pp. 1-280.

Unknown, Author, "Machine-to-Machine communications (M2M); Functional architecture", ETSI TS 102 690 V1.1.1, Oct. 2011, 1-280.

* cited by examiner

SELECTION OF M2M DEVICES BY EXTERNAL TRIGGERING

RELATED APPLICATIONS

This application claims the benefit of and priority to U.S. Provisional Patent Application Ser. No. 61/663,091, filed 22 Jun. 2012. The entire contents of said U.S. Provisional Patent Application are incorporated herein by reference.

TECHNICAL FIELD

The present disclosure generally relates to access networks and service provider networks external to such access networks, and particularly relates to techniques in an access network for mapping external identifiers for devices, used by a service provider network, to internal identifiers used by the access network.

BACKGROUND

In an environment in which Machine-to-Machine (M2M) devices are connected to an M2M service provider (SP) through an access network provided by another entity, the M2M service provider effectively creates a service layer on top of the access network. This service layer is used to deliver services to the M2M devices, but it will be understood that to identify devices on the network there is a requirement for one or more identities on this access network to provide this service. In the M2M framework developed by the European Telecommunications Standards Institute (ETSI), the M2M Service Provider (SP) interworks with the access network with respect to an M2M device that is subscribed with the M2M SP. This interworking is typically performed using an external identifier specifically selected for that purpose, although other available identifiers that might be used to identify the M2M device include the device's Mobile Station Integrated Services Digital Network-Number (MSISDN) or IP Multimedia Public Identity (IMPU). The external identifier is typically allocated to an M2M service provider by the access network for the M2M device. The external identifier is used for interworking purposes instead of the IMSI, which is typically reserved for use as access network private identity that is not used on external (public) interfaces.

Large-scale deployments of M2M devices are anticipated, and may require implementation of multiple applications in each of many M2M devices. In some cases, different applications on an M2M device will correspond to different M2M SPs. While in many cases the M2M device will initiate communications through the access network to the external M2M SP(s), in some cases the connectivity provided to the device by the access network should be triggered by the M2M SP. This is the rationale behind a device triggering procedure specified by the $3^{rd}$-Generation Partnership Project (3GPP), for use by M2M SPs seeking to initiate a connection with a M2M device from outside the access network serving the M2M Device. This device triggering procedure is referred to as MTC Device Triggering by 3GPP, where "MTC" refers to "Machine-Type Communications."

Accordingly, an external identifier is defined in Release 11 of the 3GPP standards, for use by M2M SPs in association with MTC Device Triggering procedures. However, the 3GPP specifications do not describe how external networks can acquire the external identifier for a particular M2M device, for interworking purposes. Furthermore, ETSI M2M standards do not yet consider the use of the MTC Device Triggering procedure, and do not specify a mechanism for acquiring external identifiers for M2M devices from cellular networks or other access networks.

SUMMARY

Embodiments of the techniques and apparatus disclosed herein may be used to provide mechanisms to allow a Machine-to-Machine (M2M) service provider to be connected to a wireless device in a wireless communications network. More particularly, some of these embodiments facilitate the activation or establishing of a data session, such as a specific Packet Data Protocol (PDP) context or specific Evolved Packet Subsystem (EPS) bearer, in response to a trigger message received from a service provider external to the wireless communications network. As detailed herein, these techniques may be particularly useful in the context of wireless devices having subscriptions to more than one M2M service provider.

Exemplary embodiments include methods implemented in one or more nodes of a wireless communications network serving a wireless device, the methods supporting triggering of the wireless device by a service provider external to the wireless communications network. In one such method, a trigger message is received from the service provider, the trigger message including an external identifier for the wireless device. An internal network identifier for the wireless device and an associated data network identifier are identified, based on the external identifier. The internal network identifier and the data network identifier are then forwarded towards the wireless device, for use by the wireless device in activating or selecting a data session. The data network identifier may include an Access Point Name (APN), or an Network Service Access Point Identifier (NSAPI), or both, in some embodiments.

Other embodiments of the techniques detailed below include methods implemented in a wireless device served by a wireless communications network and having a service capability layer (SCL) corresponding to a service provided by a service provider external to the wireless communications network. In an example, a wireless device receives a trigger message from a node in the wireless communications network, the trigger message including a data network identifier corresponding to the service provider. The wireless device then activates a data session or selects an activated data session, based on the data network identifier. For instance, the wireless device activates a PDP context corresponding to the data network identifier, or establishes an EPS bearer corresponding to the data network identifier.

Other embodiments of the techniques detailed herein include apparatus configured to carry out all or parts of the processes detailed below and summarized above. For instance, one such embodiment is a home subscriber server node for use in a wireless communications network serving a wireless device, the home subscriber server node comprising one or more interfaces adapted for communication with at least a radio access network serving the wireless device and one or more other nodes in the wireless communication network, and one or more processing circuits. The one or more processing circuits are adapted to maintain a binding between an external identifier for the wireless device, an internal identifier for the wireless device, and a data network identifier corresponding to the external identifier, to receive a query from a second node in the radio access network, the query comprising the external identifier for the wireless device, and to retrieve the internal network identifier and an associated data network identifier, in response to the query and based on the maintained binding. The one or more processing circuits are further adapted to send the internal network identifier and the associated data network identifier to the second node.

Another example embodiment is an interworking function (IWF) node for use in a wireless communications network serving a wireless device, the IWF node comprising one or more interfaces adapted for communication with at least a home subscriber server node in the wireless communications network and an external service provider, and one or more processing circuits. The one or more processing circuits are adapted to receive a trigger message from the service provider, the trigger message including an external identifier for the wireless device, to identify an internal network identifier for the wireless device and an associated data network identifier, based on the external identifier, and to forward the internal network identifier and the data network identifier towards the wireless device, via one of the interfaces, for use in activating or selecting a data session.

Of course, the techniques, systems, and apparatus described herein are not limited to the above features and advantages. Indeed, those skilled in the art will recognize additional features and advantages upon reading the following detailed description, and upon viewing the accompanying drawings.

BRIEF DESCRIPTION OF THE DRAWINGS

Embodiments of the present techniques will now be described, by way of example only, with reference to the attached Figures, wherein.

DETAILED DESCRIPTION

In the discussion that follows, reference may be made below to specific elements, numbered in accordance with the attached figures. The discussion below should be taken to be exemplary in nature, and not as limiting the scope of the presently described techniques, which is defined in the claims and should not be considered as limited by the implementation details described below, which as one skilled in the art will appreciate, can be modified by replacing elements with equivalent functional elements.

The present disclosure uses both the term "M2M device" and the term "wireless device." The term "M2M device" is sometimes used by those skilled in the art to refer to a logical entity, as opposed to a physical entity. Of course, in practice this logical entity is embodied in a physical device. Accordingly, as used herein, the term "M2M device" should be understood to refer to the logical entity as embodied in a physical device, such as a 3GPP UE or another wireless device. As a result, the terms "M2M device" and "wireless device" as used herein may generally be regarded as interchangeable, unless the context indicates otherwise.

Figure 1:
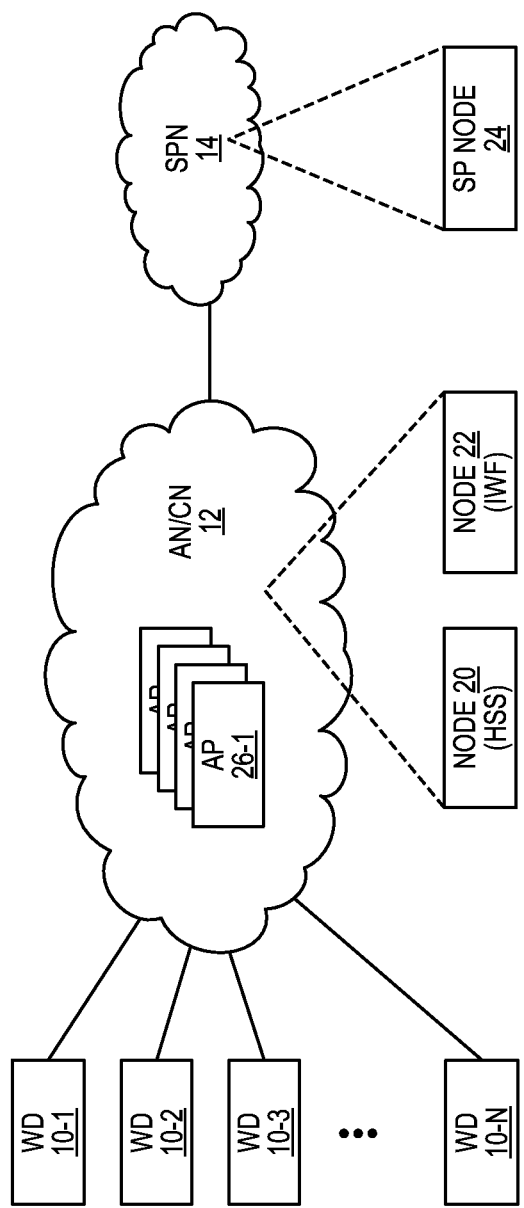
FIG. 1 is a block diagram of example access and service provider networks and associated wireless devices, according to one or more embodiments taught herein.

FIG. 1 illustrates a plurality of wireless devices 10, which are individually referenced as device 10-1, 10-2, and so on, when needed for clarity, and are otherwise referred to generically as "wireless devices 10" in the plural sense and as "wireless device 10" in the singular sense. While connectivity between the wireless devices 10 and an access network 12 is suggested in the diagram, it will be appreciated that not all of the wireless devices 10 are necessarily in operation or connected to the access network 12 at any given instant in time. Note that in the diagram, the access network 12 is abbreviated as "AN/CN 12" merely to connote that there generally are Core Network (CN) entities of interest therein. These entities are discussed later herein.

For now, it should be understood that each wireless device 10 is configured for communication with the access network 12, and for communication with a service provider network 14, which is accessible to the wireless device 10 via the access network 12. In an example case, the access network 12 comprises a Third Generation Partnership Project (3GPP) access network, such as a WCDMA- or LTE-based cellular data network, and each wireless device 10 comprises a User Equipment or UE, which includes a 3GPP-based radio modem or other such transceiver circuitry for communicating with the 3GPP network. In another example, the access network 12 comprises a network specified by the $3^{rd}$-Generation Partnership Project 2 (3GPP2) and supporting radio access based on Code-Division Multiple Access (CDMA) and/or High-Rate Packet Data (HRPD) technologies. More broadly, the wireless device 10 includes a communication transceiver for communicating with the access network, which may be essentially any type of network usable for connecting to the service provider network 14, and includes processing circuitry configured for the appropriate protocols and signaling with respect to both such networks.

In more detail, the wireless device 10 is configured or otherwise provisioned with subscription credentials or other such authentication information as needed to attach to and establish a data session with the access network 12, and as needed for registering for a service provided by the service provider network 14, and communicating with the service provider network 14 in the context of that service. In a non-limiting example, the wireless device 10 hosts a Machine-Type-Communication (MTC) application that is subscribed to a Machine-to-Machine (M2M) service provided in the service provider network 14 operating as an M2M network.

Thus, in initializing or otherwise initially registering the MTC application, the wireless device 10 attaches to the access network 12, establishes a data session with the access network 12 for communicating with the service provider network 14, and then uses that data session to register the MTC application in the M2M network. According to the advantageous teachings herein, various nodes in the access network 12 and in the service provider network 14 are configured to facilitate that initial registration in a manner that allows the service provider network 14 to bind a service provider network identifier used by the service provider network 14 to identify the wireless device 10 with respect to a service provided by the service provider network 14, and an external identifier that is assigned by the access network 12 to the wireless device 10, for used by the service provider network 14 in identifying the wireless device 10 to the access network 12.

As those of ordinary skill in the art will appreciate, use of the external identifier allows the access network 12 to keep private the International Mobile Subscriber Identity (IMSI) or other such access network identifier of the wireless device 10. That is, the access network 12 does not provide the access network identifier of the wireless device 10 to the service provider network 14 and instead provides an external identifier that has been logically bound to the access network identifier within the access network 12.

In this manner, the IMSI or other sensitive access network identifier of the wireless device 10 is not compromised by releasing it to the external service provider network 14. However, the external identifier itself has no predefined meaning within the service provider network 14, because the service provider network 14 uses a service provider network identifier—e.g., an identifier embedded in service credentials provisioned within the wireless device 10—to identify the wireless device 10. Consequently, without more, simply receiving an external identifier from the access network 12 is of little value to the service provider network 14 because it does not know in advance which one of the plurality of wireless devices 10 has been assigned to the external identifier by the access network 12.

In this regard, these detailed teachings disclose advantageous example configurations for a Home Subscriber Server (HSS), as represented by node 20, an interworking function (IWF), as represented by node 22, and the wireless device 10, which uses an access point 26-1, 26-2, and so on, in the access network 12 to access the service provider network 14. In some embodiments, an Authentication, Authorization, and Accounting (AAA) server, as represented by node 28, may also be involved in the techniques detailed below. More particularly, these detailed teachings disclose example operations at these respective nodes and at the wireless device 10, which provide for an automatic and secure association between the service provider network identifier assigned in the service provider network 14 to any given one among a plurality of wireless devices 10, and the external identifier assigned to that wireless device 10 by the access network 12. As will be seen, the techniques below also provide for an association between these identifiers and a data network identifier, such as an Access Point Name (APN) or Network Service Access Point Identifier (NSAPI), which is sent to the wireless device 10 to allow it to establish or activate a data connection to the right service provider.

The following discussion frequently refers to a Packet Data Protocol (PDP) context in explaining several implementations of the techniques disclosed herein. It should be appreciated, however, that a PDP context is only one example of a descriptor or descriptors that correspond to a data session or "virtual connection" between an M2M device and a service provider node external to the access network. Another example, for instance, is the Evolved Packet Subsystem (EPS) bearer. Accordingly, it should be understood that the specific techniques described below in reference to a PDP context are more generally applicable to other types of virtual connections and associations and to their corresponding descriptors and identifiers.

Today, no mechanism that allows selection of the specific Packet Data Protocol (PDP) context to activate as a consequence of the Device Triggering procedure is defined in the 3GPP standards. Currently, in the event that a wireless device such as a 3GPP UE is provided with more than one PDP context, the wireless device does not have the means to properly select the particular PDP context being activated when the Device Triggering procedure is initiated by a service provider towards a particular external identifier. This problem limits the use of conventional device triggering procedures, in that it precludes the support of multiple PDP contexts for different M2M SPs or for different purposes.

Accordingly, in several embodiments of the techniques and systems detailed below, an association of a specific PDP context or EPS bearer, for example, to the external identifier is used for the Device Triggering function. The PDP context identifier or other data network identifier corresponding to the association between the M2M device and the SP service is provided by an access network node, in response to the Device Triggering initiation, and transmitted to the UE to activate the proper data session towards the M2M SP. The access network node maintaining the association between the external identifier and the data network identifier (e.g., a PDP context identifier) may be a Home Subscriber Server (HSS) in a 3GPP IP Multimedia Subsystem (IMS) context, in some embodiments, or a similar or related node in the context of a 3GPP network or other network.

Figure 2:
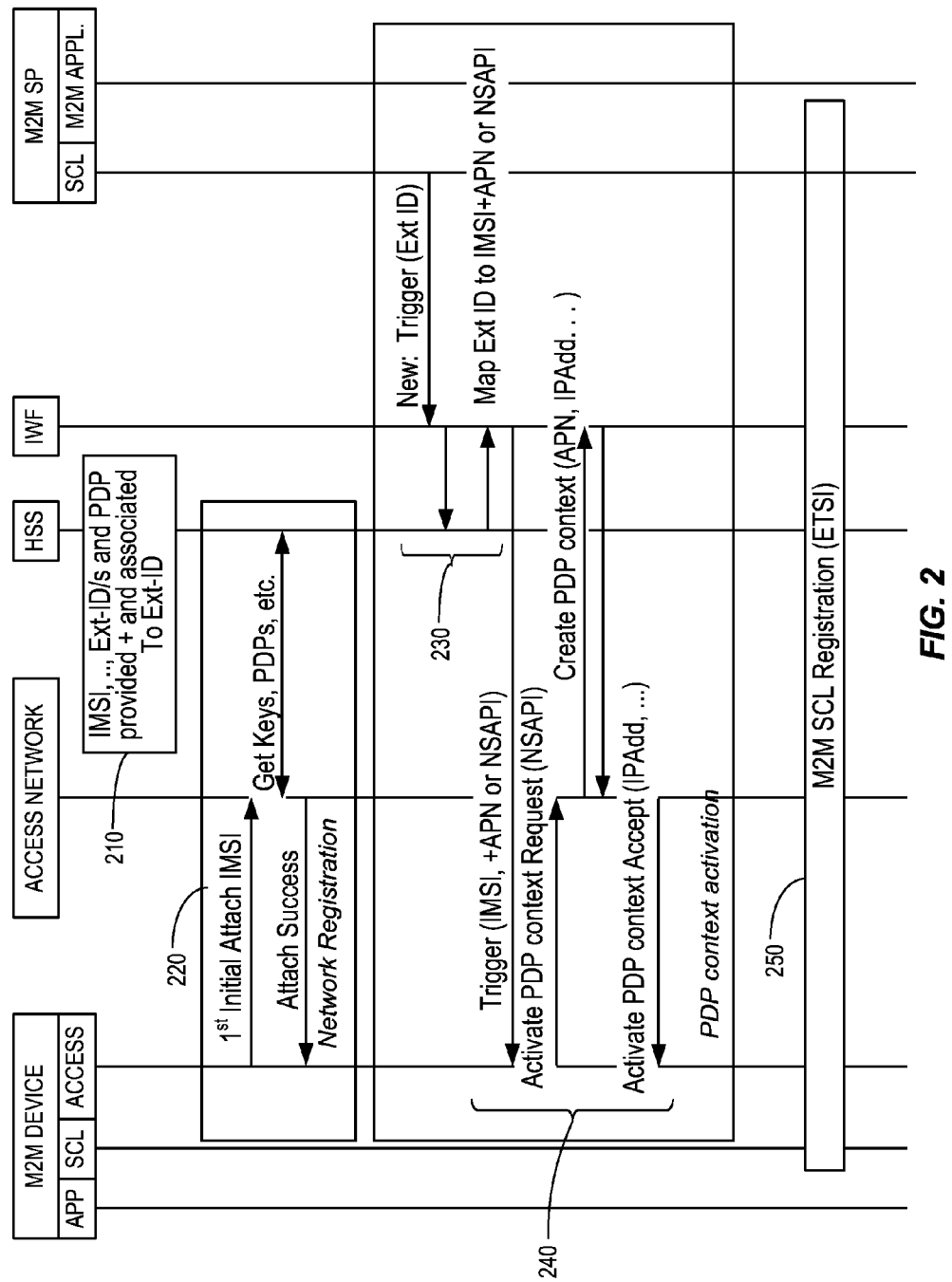
FIG. 2 is a signal flow diagram according to one or more embodiments taught herein.

FIG. 2 illustrates an example signal flow according to some embodiments of the techniques and systems described herein. More particularly, FIG. 2 illustrates an example of signal flow among an M2M device, an access network, a Home Subscriber Server (HSS), an Inter-working Function (IWF), and an M2M Service Provider (SP) node. It should be understood that the term "access network," as used herein, refers to the equipment that provides a wireless device with connectivity to an IP network, such as the various radio access networks defined by 3GPP and 3GPP2 specifications. The HSS is part of the "core network" of a network operator, and manages subscription-related information for users of the access network and core network, e.g., in the context of an IP Multimedia Subsystem (IMS). Generally speaking, an IWF is a node that provides interfacing between the access network and a public-switched telephone network (PSTN). In this context, however, the term IWF is used more specifically, to refer to a node that provides an interface between the access network/core network and an MTC/M2M server that is external to the access network/core network.

Referring to FIG. 2, it can be seen that the M2M device comprises an M2M application (APP), a Service Capability Layer (SCL), and an access function. It should be appreciated that the access function may correspond to the hardware, software, and firmware that make up any of a variety of wireless devices adapted to access a wireless communications network, such as a UE configured to access a so-called Long-Term Evolution (LTE) network or Universal Mobile Telecommunications System (UMTS) network, as specified by 3GPP. The Service Capability Layer (SCL) is an M2M concept standardized by ETSI, and represents an abstraction layer of the M2M software where common functionalities are implemented to serve the M2M application. The software implementing the SCL in the M2M device provides a set of APIs to expose the M2M service capabilities to the M2M application. An instantiation of the SCL is identified by an SCL identifier (SCL-ID) that is maintained by the M2M SP and pre-configured in the device or acquired during a bootstrap process. Note that the M2M SCL in the M2M device corresponds directly to an M2M SCL in the M2M SP node, as seen at the right-hand side of FIG. 2.

Referring again to FIG. 2, it can be seen at 210 that the HSS provides an external identifier and an associated PDP context to be activated as a consequence of a Device Triggering function that uses the external identifier. For purposes of understanding FIG. 2, it can be assumed that the external identifier has previously been provided to the M2M SP or transferred to it from the mobile network operator by any number of means. The particular mechanisms used to transfer the external identifier are not necessarily germane to the techniques disclosed herein.

As shown at 220, the M2M device, at power on, attaches to the access network, e.g., using the device's IMSI. In doing so, the M2M device (access part) is preferably authenticated for network access, e.g., by the HSS, using conventional procedures. Once successfully authenticated, the access profile for the M2M device can be downloaded in the access network for enforcement purposes. This may include, for example, the allowed PDP contexts or other allowed connections. Keys, allowed PDP contexts, etc., are exchanged.

As shown at 230, the M2M SP initiates the Device Triggering procedure towards the Interworking Function (IWF), using the external identifier. In response, the IWF queries the HSS with the external identifier, and receives, in response, an internal identifier for the M2M device, such as the device IMSI that is bound to the external identifier. The IWF also receives, along with the internal identifier, an identifier of the associated PDP context that the corresponding M2M device can use when it initiates a PDP context. This identifier, which can be a data network identifier such as an Access Point Name (APN) or Network Service Access Point Identifier (NSAPI), can then be propagated through the system towards the M2M device, to allow it to select the proper PDP context to activate as a consequence of the Device Triggering procedure. Thus, as shown at 240, the IWF forwards a trigger message to the M2M device, the trigger message including the internal identifier for the device as well as the data network identifier (e.g., an APN or NSAPI). In response to the trigger message, the M2M device activates the PDP context indicated by the data network identifier, e.g., by using the APN provided in the trigger message. By activating the PDP context, the M2M device thus establishes a connection with the M2M SP node, via the IWF. Once the device has been awakened and connected to the M2M SP with the specific PDP context, existing ETSI procedures can be executed, such as a Device SCL (DSCL) or Gateway SCL (GSCL) registration with the M2M SP node.

One particular advantage of the technique described above is that facilitates the handling of multiple M2M-related subscriptions in a single device. When the same physical device has multiple subscriptions, a different external identifier for the wireless device is allocated to each M2M service provider. Each external identifier is then associated with a different data network identifier (e.g., an APN), where the data network identifier allows the wireless device to connect to the service provider corresponding to the external identifier.

Figure 3:
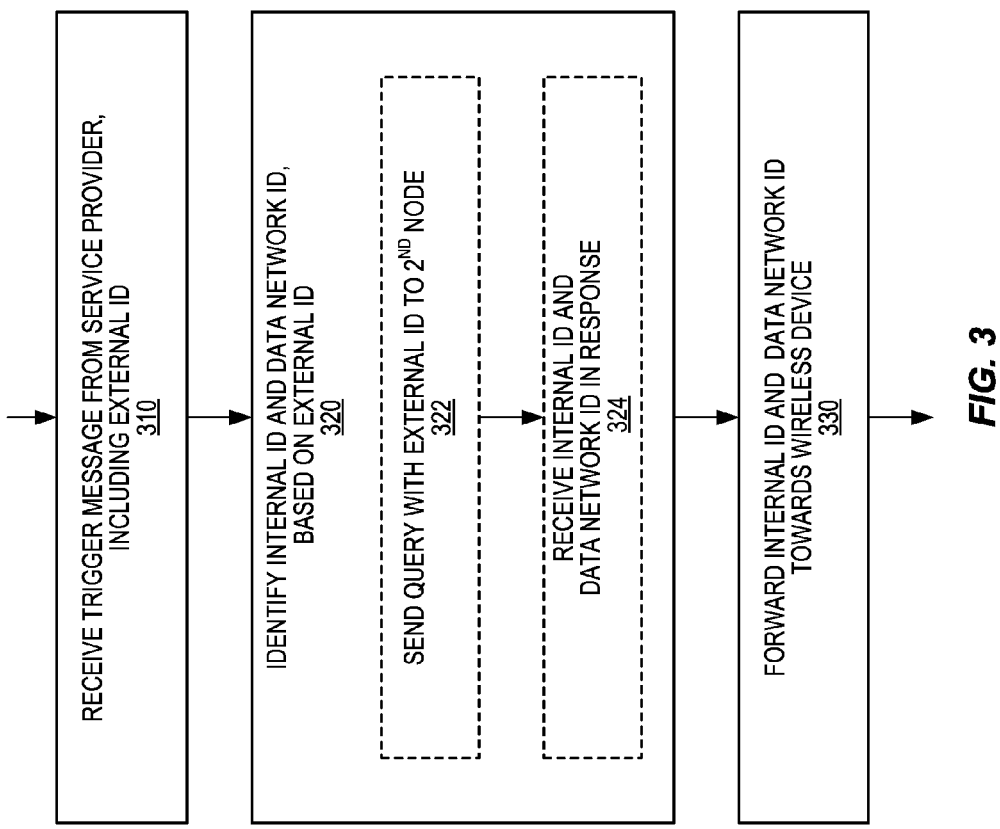
FIG. 3 is a process flow diagram of one embodiment of a method of supporting triggering of a wireless device by a service provider external to a wireless communications network serving the wireless device.

With the example signaling flow of FIG. 2 in mind, it will be appreciated that FIG. 3 illustrates a generalized method for supporting triggering of a wireless device by a service provider external to the wireless communications network serving the wireless device, as might be implemented in one or more nodes of the wireless communications network, such as an IWF and/or an HSS.

As shown at block 310, the illustrated method begins with receiving a trigger message from a service provider that is external to the wireless communications network serving a wireless device. The trigger message includes an external identifier for the wireless device. This external identifier may take any of a number of formats, such as a numerical or text identifier. As noted above, the particular mechanisms by which the service provider obtained the external identifier are not important to understanding the present techniques. As will be seen below, the applicability of these techniques assumes only that a node in the wireless communications network is maintaining an association between the external identifier for the wireless device and an internal network identifier for the wireless device.

Referring once again to FIG. 3, the illustrated method continues with an identification of an internal network identifier for the wireless device and an associated data network identifier, based on the external identifier. This is illustrated at block 320. In some embodiments, for example, the data network identifier corresponds to a particular PDP context or to a particular EPS bearer. In some embodiments it may be particularly convenient to use an APN, or an NSAPI, or both, as the data network identifier, although it will be appreciated that other identifiers specific to a data session or virtual connection between the wireless device and the service provider may be used.

In some embodiments, the trigger message received from the service provider is received at an InterWorking Function (IWF) node in the wireless communications network. As used here, the IWF node should be understood to refer to a node in the wireless communications network that provides an interface between the core network of the wireless communications network and a server or other node accessing the wireless communications network externally. As shown at blocks 322 and 324, an IWF node in some embodiments may respond to the received trigger message by sending a query to a second node in the wireless communications network, the query comprising the external identifier, and receiving the internal network identifier and the associated data network identifier in response to the query. The second node may be a HSS, for example, in some embodiments.

In some embodiments, however, the node receiving the trigger message is also the node that maintains the association between the external identifier, the internal network identifier, and the data network identifier. This might be the case in a node that combines IWF and HSS functionality, for example. In these embodiments, the query to a second node may not be necessary. For this reason, blocks 322 and 324 are shown with a dashed outline, indicating that these operations need not appear in every embodiment or in every scenario. Other variations on the process shown in FIG. 3 are also possible, of course. For instance, in some cases an Authentication, Authorization, and Accounting (AAA) server in the wireless communications network may be involved. In such a system, the IWF receiving the trigger message with the external identifier sends a first query to the AAA server to obtain an internal identifier for the wireless device. This is typically not the IMSI, but a user name associated with the IMSI. The IFW then sends a second query with this internal identifier to the HSSS to get the data network identifier (e.g., APN and/or NSAPI).

As shown at block 330, the internal network identifier and the data network identifier are forwarded towards the wireless device corresponding to the internal network identifier, for use by the wireless device in activating or selecting a data session. As noted earlier, the data network identifier may include an APN or a NSAPI, for example. The data network identifier may be used to activate a PDP context or to select one of several already activated PDP contexts, in various embodiments and/or scenarios. Likewise, the data network identifier may be used to establish an EPS bearer or to select one of several already established EPS bearers, in some embodiments. In some embodiments, the internal network identifier may be an IMSI. This approach may allow maximum reuse of conventional signaling in some embodiments. However, other internal network identifiers may be used, in other embodiments.

In some embodiments, forwarding the internal network identifier and the data network identifier towards the wireless device may comprise sending a second trigger message to the wireless device, via a radio access network, where the second trigger message includes the associated data network identifier. This may be followed by receiving, at a node in the radio access network, a request for activating a data session corresponding to the data network identifier in the second trigger message. An illustrative example of this is shown in FIG. 2, at 240. In this embodiment, the second trigger message triggers the M2M device to send a request for activating a PDP context corresponding to the data network identifier (in this case an NSAPI); this request for activating a PDP context corresponds to the request for activating a data session discussed above. It will be appreciated that the request for activating a data session may comprise a request for activating an EPS bearer corresponding to the data network identifier, in other embodiments or under other circumstances.

It should further be appreciated that the process illustrated in FIG. 2 can be used to facilitate the handling of multiple M2M-related subscriptions in a single device. When the same physical device has multiple subscriptions, a different external identifier for the wireless device is allocated to each M2M service provider. Each external identifier is then associated with a different data network identifier (e.g., an APN), where the data network identifier allows the wireless device to connect to the service provider corresponding to the external identifier. When such an M2M device receives the second trigger message described above, it can then respond by activating or selecting one of a plurality of data sessions having corresponding data network identifiers that differ from one another, where one of them is the data network identifier provided in the second trigger message.

The various nodes of the above discussion can be implemented through the use of a processor operatively connected to a memory storing instructions that cause the processor to carry out the methods described above. Communication with external nodes can be managed through the use of a network interface. In a logical mapping, engines and processors can be used for individual steps and functions to create a logical instance of a node.

Figure 4:
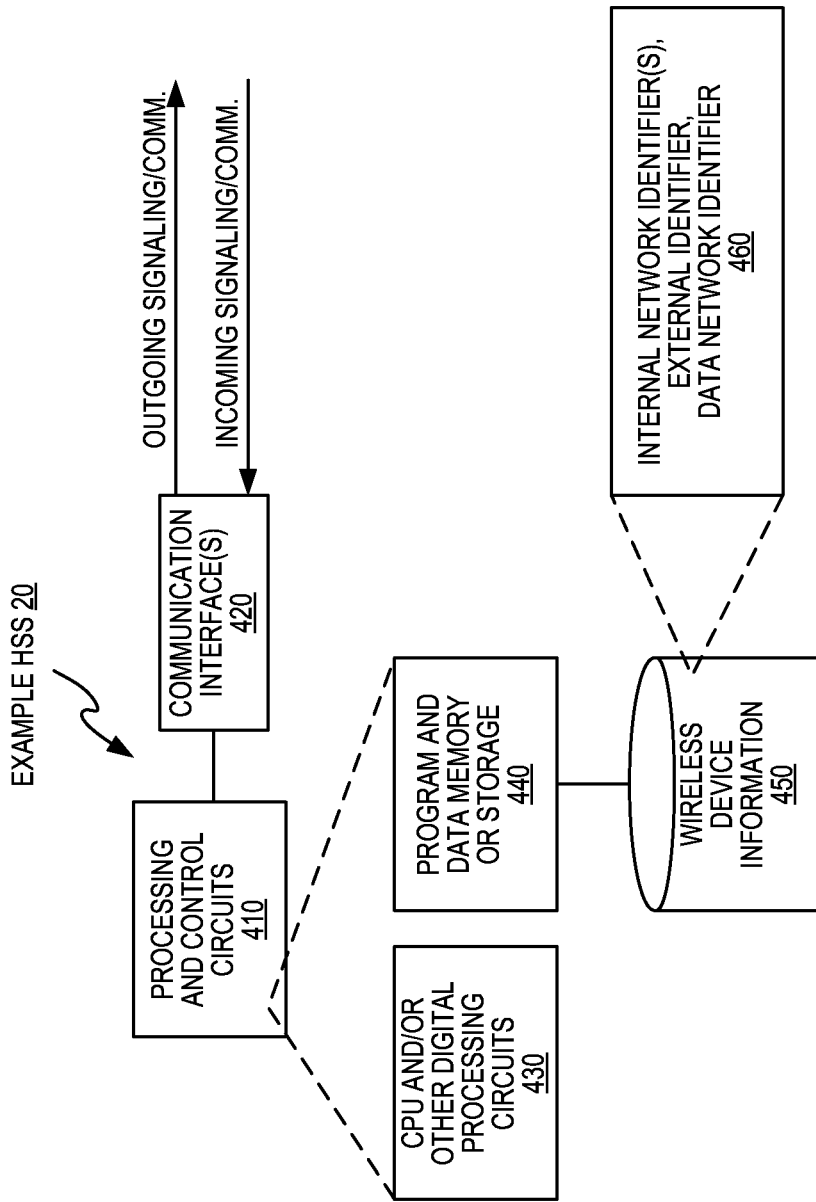
FIG. 4 is a block diagram of one embodiment of an HSS or other node within the access network that is configured to perform all or part of the method illustrated in FIG. 3.

FIG. 4, for instance, introduces an example network node configured as an HSS 20, which may be adapted to implement all or part of the process illustrated in FIG. 3 and/or part of the signaling flow shown in FIG. 2, and/or well as variations of that method and signaling flow. In the illustrated example, the HSS 20 comprises a communication interface 420 that is configured to communicate with the IWF 22, which communicatively links the access network 12 of the HSS 20 to the service provider network 14, which is external to the access network 12. It will be understood that the communication interface 420 actually may comprise multiple interfaces, and may interface to more than one physical layer and/or may support a number of signaling protocols and interface types for communicating with multiple types of other nodes.

The HSS 20 further includes a processing circuit 410 that is operatively associated with the communication interface 420. For example, the processing circuit 410 comprises one or more CPUs or other digital processing circuitry 430 that includes or is associated with a computer-readable medium, such as program and data memory or other storage 440. The storage 440 holds wireless device information 450, among other things.

For example, the storage 440, which may be non-volatile storage, holds information that binds or maps individual external identifiers to respective internal network identifiers used by the wireless communications network. In particular, the wireless device information 450 held by storage 440 includes internal network identifier(s) for each of one or more wireless devices 10, along with one or more associated external identifiers and one or more associated data network identifiers, as shown at 460. More broadly, the wireless device information 450 may comprise information identifying the service provider network 14, information identifying the wireless devices 10 that are associated with the service provider network 14, and information identifying the external identifiers—e.g., a range—to be allocated to individual ones of the wireless devices 10 that are associated with the service provider network 14.

The information identifying the associated wireless devices 10 may comprise the IMSIs or other such access network identifiers of the wireless devices 10, so that individual ones of the wireless devices 10 can be recognized as being associated with the service provider network 14 when they attach to the access network 12. Further, the wireless device information 450 may include an APN or NSAPI values for use by the wireless devices 10 in directing communications toward the service provider network 14. Also, as noted, the wireless device information 450 may comprise a list or range of external identifiers that have been allocated or otherwise predefined for use with the service provider network 14.

In a particular but non-limiting example, the storage 440 is used by the HSS 20 to maintain the following mapping for a given wireless device 10: internal network identifier→external identifier→data network identifier for the service provider network 14, including for example, an APN or NSAPI associated with the service provider network 14. Thus, in at least one embodiment, the HSS 20 is configured to store wireless device information accessible to the processing circuit 410, where the wireless device information includes the internal network identifier of the wireless device 10, as mapped to the external identifier assigned to the wireless device 10, and as further mapped to the access point name or identifier and the service provider network 14.

In several embodiments, the processing circuit 410 in HSS 20 is adapted (e.g., with suitable program code stored in program and data memory or storage 440) to carry out all or parts of the method illustrated in FIG. 3, and variants thereof. More particularly, the processing circuit 410 in some embodiments is configured to maintain a binding between an external identifier for the wireless device, an internal identifier for the wireless device, and a data network identifier corresponding to the external identifier, to receive a query from a second node in the radio access network (e.g., via communication interface(s) 420), the query comprising the external identifier for the wireless device, to retrieve the internal network identifier and an associated data network identifier, in response to the query and based on the maintained binding, and to send (e.g., via the communication interface(s) 420) the internal network identifier and the associated data network identifier to the second node. As discussed above, the second node may be an interworking function (IWF) node, in some embodiments. In some embodiments, the internal identifier is an IMSI for the wireless device. Likewise, the associated data network identifier includes an APN or a NSAPI, or both, in some embodiments.

Figure 5:
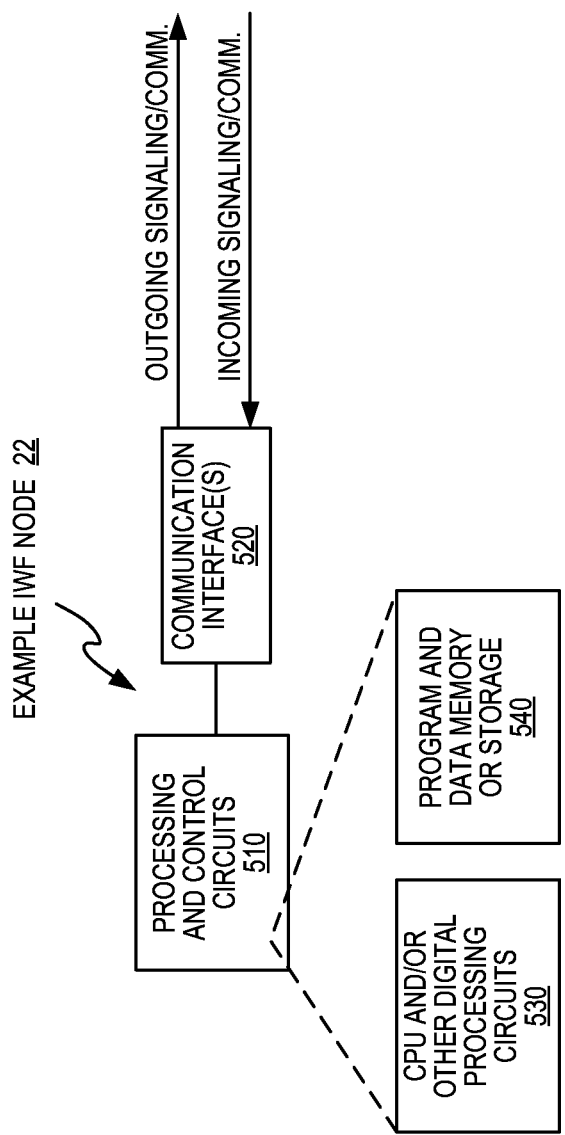
FIG. 5 is a block diagram of one embodiment of an IWF or other node within the access network that is configured to perform all or part of the method illustrated in FIG. 3.

FIG. 5, introduces another example network node, in this case configured as an IWF 22, which again may be adapted to implement all or part of the process illustrated in FIG. 3 and/or part of the signaling flow shown in FIG. 2, and/or well as variations of that method and signaling flow. Thus, in one or more embodiments, the network node 22 pictured in FIG. 5 is configured to implement an IWF between an access network 12 and a service provider network 14. In the illustrated example, the network node 22 comprises a communication interface 520 that is configured to send signaling toward and to receive signaling from one or more nodes within an access network 12, e.g., an HSS 20, and to send signaling toward and to receive signaling from one or more nodes within a service provider network 14, e.g., the service provider network node 24. Of course, it will be appreciated that the communication interface 520 may, in fact, comprise more than one interface and/or may implement multiple physical-layer interfaces and/or signaling protocols for communicating within the access network 12, with the service provider network 14, and with wireless devices 10 via the access network 12.

The node 22 implements the IWF based on further including a processing circuit 510 that is operatively associated with the communication interface 520. The processing circuit 510 may comprise one or more CPUs or other digital processing circuitry 530 that includes or is associated with one or more computer-readable mediums, such as program and data memory or storage 540. In an example configuration, the storage 540 stores a computer program comprising computer program instructions. The processing circuit 510 is configured to carry out all or part of the method illustrated in FIG. 3, based at least partially on its execution of the stored computer program instructions. The storage 540 also may be used to store at least temporarily information that is received from the HSS 20 and/or from the service provider network 14. For example, the storage 540 may be used to store external identifiers, NAP or NSAPI information, bound tokens, etc., in support of the IWF operations disclosed herein.

More particularly, in some embodiments processing circuit 510 is adapted (e.g., using program code stored in storage 540) to receive a trigger message from the service provider, the trigger message including an external identifier for the wireless device, to identify an internal network identifier for the wireless device and an associated data network identifier, based on the external identifier, and to forward the internal network identifier and the data network identifier towards the wireless device, via one of the interfaces, for use in activating or selecting a data session.

In some embodiments, processing circuit 510 is adapted to identify the internal network identifier for the wireless device and the associated data network identifier by sending a query to a second node in the wireless communications network, the query comprising the external identifier, and receiving the internal network identifier and the associated data network identifier in response to the query. This second node is a Home Subscriber Server (HSS) node, in some embodiments. In some embodiments, the internal network identifier is an IMSI for the wireless device. The associated data network identifier includes an APN or a NSAPI, or both, in some embodiments. In any of these or in other embodiments, processing circuit 510 may be adapted to forward the internal network identifier and the data network identifier towards the wireless device by sending a trigger message to the wireless device, via the radio access network, the trigger message comprising the associated data network identifier.

Figure 6:
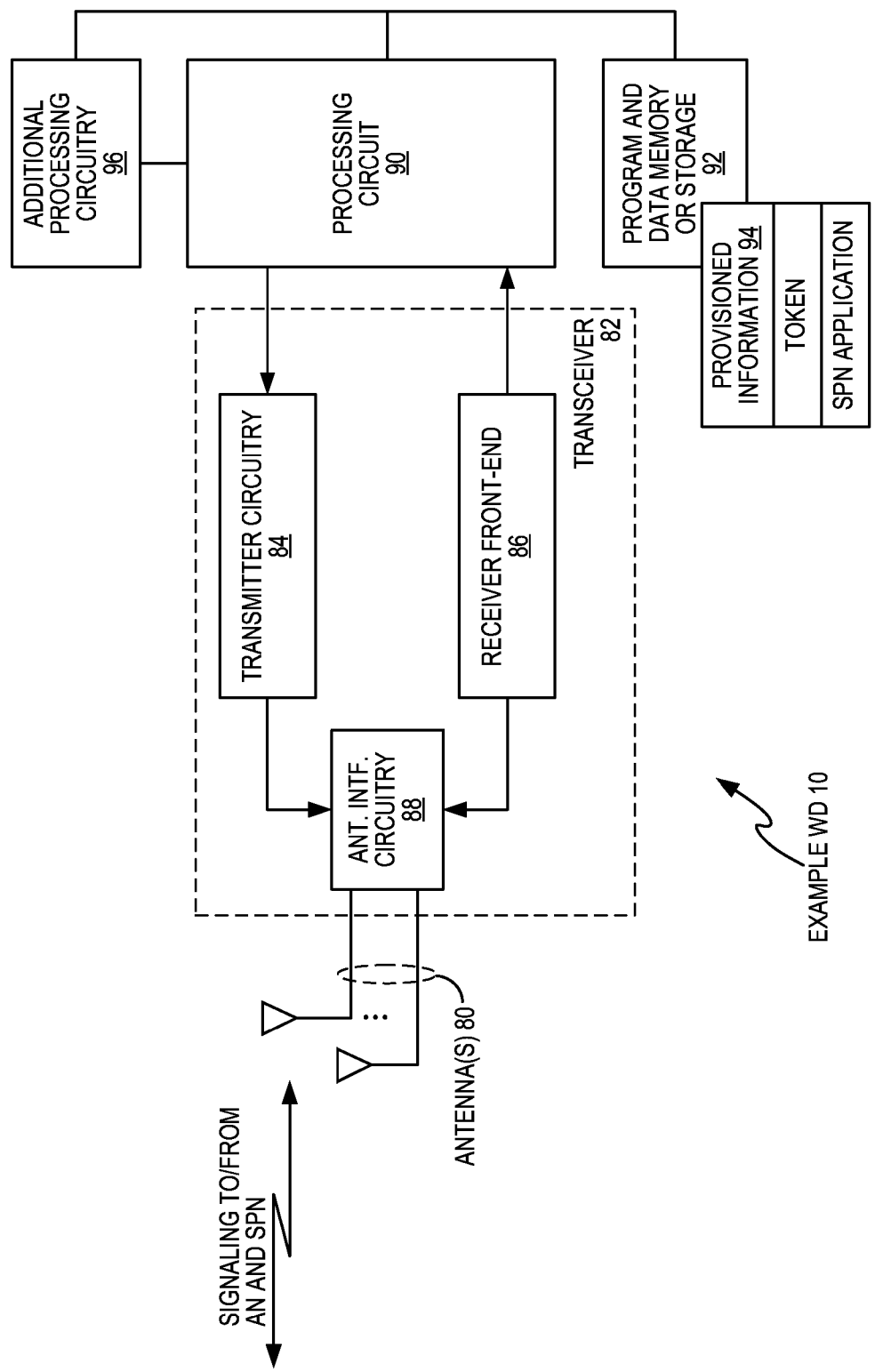
FIG. 6 is a block diagram of one embodiment of a wireless device configured according to some of the embodiments detailed below.

FIG. 6 shows an example wireless device 10 that is configured to implement a portion of the signaling flow illustrated in FIG. 2 or a similar signaling flow. The illustrated wireless device 10 includes a one or more transmit and receive antennas 80 and an associated communication transceiver 82. The communication transceiver 82 includes transmitter circuitry 84, a receiver front-end 86, and antenna interface circuitry 88.

The wireless device 10 further includes one or more processing circuits 90, which include or are associated with program data memory or other such storage 92. The storage 92 includes, for example, provisioned information 94 and an application 96 that uses a service provided by the service provider network 14. In an example case, execution of the application 96 by the processing circuit 90 configures the wireless device 10 for communication with the service provider network 14.

Here, it will be understood that the processing circuit 90 may comprise baseband processing circuits and other supporting circuitry needed for authenticating to the access network 12 and communicating with the access network 12, via the transceiver 82. For example, the transceiver 82 may comprise a cellular radio transceiver configured according to one or more cellular network standards, such as the GSM, WCDMA and/or LTE standards.

Further, while such functionality may be implemented using functionally or physically separate processors, the processing circuit 90 may further include one or more "application processors," which are microprocessors or other digital processing circuitry configured to host/execute the application 96. The additional processing circuitry 98 may supplement such functionality, e.g., by providing user interfaces, I/O circuitry for interfacing with monitoring and/or control systems, etc.

In any case, the transceiver 82, which may be referred to generically as the "communication interface 82," is configured to communicate with the access network 12 and with the service provider network 14, via signaling conveyed through the access network 12. Operations of the processing circuit 90 generally are involved in supporting such communications, e.g., by providing baseband transmit and receive processing, etc.

Of more interest, the processing circuit 90 is operatively associated with the communication interface 82 and configured to receive a trigger message from a node in the wireless communications network, the trigger message including a data network identifier corresponding to the service provider, and to activate a data session or select an activated data session, based on the data network identifier. In some embodiments, such as embodiments adapted to carry out the signaling flow of Figure, the wireless device 10 is configured to activate a data session or select an activated data session by activating a PDP context corresponding to the data network identifier. In other embodiments, the wireless device 10 establishes an Evolved Packet Subsystem (EPS) bearer corresponding to the data network identifier. In some embodiments, the trigger message received by the wireless device 10 indicates an APN or NSAPI and the processing circuit 90 is configured to use the APN or NSAPI for establishing the data session.

The processing circuit 90 is further configured to establish a data session with the access network 12, for registering for a service with the service provider network 14, and to send registration signaling to the service provider network 14 via that data session. Advantageously, the registration signaling indicates the service provider network identifier of the wireless device 10, which identifies the wireless device 10 with respect to the service. In an example configuration, the service provider network 14 is an MTC network, and the application 96 is an MTC application that interacts with an M2M service provided by the MTC network. As such, the processing circuit 90 is configured to perform the registration for the service as an M2M SCL registration with the MTC network.

As can be seen from the detailed descriptions of FIGS. 4, 5, and 6, embodiments of the techniques presented herein may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described techniques may also be stored on the machine-readable medium. Software running from the machine-readable medium may interface with circuitry to perform the described tasks.

The above-described embodiments of the present techniques are intended to be examples only. Alterations, modifications and variations may be effected to the particular embodiments by those of skill in the art without departing from the scope of the present techniques, which is defined solely by the claims appended hereto.

With these and other variations and extensions in mind, those skilled in the art will appreciate that the foregoing description and the accompanying drawings represent non-limiting examples of the systems and apparatus taught herein. As such, the present techniques are not limited by the foregoing description and accompanying drawings, but instead are limited only by the following claims and their legal equivalents.

What is claimed is:

1. A method, in one or more nodes of a wireless communications network serving a wireless device, of supporting triggering of the wireless device by a service provider external to the wireless communications network, the method comprising:
    receiving a trigger message from the service provider, the trigger message including an external identifier for the wireless device;
    identifying an internal network identifier for the wireless device and an associated data network identifier, based on the external identifier; and
    forwarding the internal network identifier and the data network identifier towards the wireless device, for use by the wireless device in activating or selecting a data session.

2. The method of claim 1, wherein the data network identifier includes an Access Point Name (APN) or a Network Service Access Point Identifier (NSAPI), or both.

3. The method of claim 1, wherein said trigger message is received at an InterWorking Function (IWF) node in the wireless communications network, and wherein said identifying comprises:
    sending a query to a second node in the wireless communications network, the query comprising the external identifier; and
    receiving the internal network identifier and the associated data network identifier in response to the query.

4. The method of claim 3, wherein said second node is a Home Subscriber Server (HSS) node.

5. The method of any of claim 1, wherein the internal network identifier is an International Mobile Subscriber Identity (IMSI) for the wireless device.

6. The method of any of claim 1, wherein forwarding the internal network identifier and the data network identifier towards the wireless device comprises sending a second trigger message to the wireless device, via a radio access network, the second trigger message comprising the associated data network identifier.

7. The method of claim 6, further comprising receiving, at a node in the radio access network, a request for activating a data session corresponding to the data network identifier in the second trigger message.

8. The method of claim 7, wherein said request for activating a data session comprises a request for activating a Packet Data Protocol (PDP) context corresponding to the data network identifier.

9. The method of claim 7, wherein said request for activating a data session comprises a request for activating an Evolved Packet Subsystem (EPS) bearer corresponding to the data network identifier.

10. The method of any of claim 7, wherein said request for activating the data session includes a Network Service Access Point Identifier (NSAPI) or Access Point Name (APN).

11. A home subscriber server node for use in a wireless communications network serving a wireless device, the home subscriber server node comprising:
    one or more interfaces adapted for communication with at least a radio access network serving the wireless device and one or more other nodes in the wireless communication network, and
    one or more processing circuits adapted to:
        maintain a binding between an external identifier for the wireless device, an internal identifier for the wireless device, and a data network identifier corresponding to the external identifier;
        receive a query from a second node in the radio access network, the query comprising the external identifier for the wireless device; and
        retrieve the internal network identifier and an associated data network identifier, in response to the query and based on the maintained binding, wherein the associated data network identifier includes an Access Point Name (APN) or a Network Service Access Point Identifier (NSAPI), or both; and
        send the internal network identifier and the associated data network identifier to the second node.

12. The home subscriber server node of claim 11, wherein said second node is an interworking function (IWF) node.

13. The home subscriber server node of claim 11, wherein the internal identifier is an International Mobile Subscriber Identity (IMSI) for the wireless device.

14. An interworking function (IWF) node for use in a wireless communications network serving a wireless device, the IWF node comprising:

one or more interfaces adapted for communication with at least a home subscriber server node in the wireless communications network and an external service provider, and one or more processing circuits adapted to:
receive a trigger message from the service provider, the trigger message including an external identifier for the wireless device;
identify an internal network identifier for the wireless device and an associated data network identifier, based on the external identifier; and
forward the internal network identifier and the data network identifier towards the wireless device, via one of the interfaces, for use in activating or selecting a data session.

15. The IWF node of claim 14, wherein the one or more processing circuits are adapted to identify the internal network identifier for the wireless device and the associated data network identifier by:
sending a query to a second node in the wireless communications network, the query comprising the external identifier; and
receiving the internal network identifier and the associated data network identifier in response to the query.

16. The IFW node of claim 15, wherein said second node is a Home Subscriber Server (HSS) node.

17. The IFW node of any of claim 14, wherein the internal network identifier is an International Mobile Subscriber Identity (IMSI) for the wireless device.

18. The IFW node of any of claim 14, wherein the associated data network identifier includes an Access Point Name (APN) or a Network Service Access Point Identifier (NSAPI) or both.

19. The IFW node of any of claim 14, wherein the one or more processing circuits are adapted to forward the internal network identifier and the data network identifier towards the wireless device by sending a trigger message to the wireless device, via the radio access network, the trigger message comprising the associated data network identifier.

20. A method, in a wireless device served by a wireless communications network and having a service capability layer (SCL) corresponding to a service provided by a service provider external to the wireless communications network, the method comprising:
receiving a trigger message from a node in the wireless communications network, the trigger message including a data network identifier corresponding to the service provider;
activating a data session or selecting an activated data session, based on the data network identifier.

21. The method of claim 20, wherein activating a data session or selecting an activated data session comprises activating a Packet Data Protocol (PDP) context corresponding to the data network identifier.

22. The method of claim 20, wherein activating a data session or selecting an activated data session comprises establishing an Evolved Packet Subsystem (EPS) bearer corresponding to the data network identifier.

23. The method of claim 20, wherein activating a data session or selecting an activated data session comprises activating one of a plurality of data sessions having corresponding data network identifiers that differ from one another.

* * * * *